(12) United States Patent  
Hicks

(10) Patent No.: US 6,382,274 B1
(45) Date of Patent: May 7, 2002

(54) DUAL POST HARVESTING HEAD

(75) Inventor: Keith Hicks, Hudson (CA)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/732,469

(22) Filed: Dec. 7, 2000

(51) Int. Cl.⁷ .............................................. A01G 23/08
(52) U.S. Cl. ........................ 144/34.1; 144/4.1; 144/336
(58) Field of Search ................. 144/4.1, 34.1, 144/24.13, 34.5, 336, 339

(56) References Cited

U.S. PATENT DOCUMENTS

| 3,795,264 A | 3/1974 | Coughran, Jr. |
| 3,910,326 A | 10/1975 | Tucek |
| 3,991,799 A | 11/1976 | Albright |
| 4,175,598 A | 11/1979 | Stoychoff |
| 4,313,479 A | 2/1982 | Coughran, Jr. |
| 4,446,897 A | 5/1984 | Kurelek |
| 4,452,286 A | 6/1984 | Menzi |
| 4,909,291 A | 3/1990 | Tremblay |
| 4,921,024 A | 5/1990 | Wiemeri et al. |
| 4,987,935 A | 1/1991 | Corcoran et al. |
| 5,004,026 A | 4/1991 | MacLennan et al. |
| 5,113,919 A | 5/1992 | MacLennan |
| 5,697,412 A | 12/1997 | Kurelek |
| 5,794,674 A | 8/1998 | Kurelek |
| 5,816,299 A | * 10/1998 | Mathews et al. ............ 144/4.1 |
| 6,068,035 A | * 5/2000 | DiSabatino et al. ......... 144/4.1 |

FOREIGN PATENT DOCUMENTS

| CA | 1188-204 A | 2/1984 |
| SU | 1145958 | 3/1985 |

* cited by examiner

Primary Examiner—W. Donald Bray
(74) Attorney, Agent, or Firm—Liza J. Meyers

(57) ABSTRACT

A tree harvesting head is disclosed. An embodiment includes an elongate frame, a first support device, a second grapple arm, a second support device, and a base portion. The first support device includes a first grapple arm. The second support device includes a collector mechanism. The base portion includes a cutting device and a guard assembly.

11 Claims, 3 Drawing Sheets

DUAL POST HARVESTING HEAD

TECHNICAL FIELD

This invention relates generally to a felling or harvesting head for harvesting trees, and, more particularly, to a harvesting head with opposing and spaced grapple arms, a dual post frame, a symmetrical accumulator pocket, and a tangent discharge chute.

BACKGROUND ART

A harvesting head is used in combination with a work machine, such as a harvester, to harvest or fell trees in the forestry industry. The harvesting head is generally mounted on a linkage attached to the work machine and placed near the tree being harvested. The harvesting head is then manipulated by the operator to engage and cut the tree. The operator may hold the cut tree on the harvesting head while cutting additional trees and then carry the accumulated cut trees to a central cut tree storage area, for greater efficiency. Generally, this is usually performed with smaller trees. Alternatively, however, the operator may cut a single large tree and carry it to the central cut tree storage area.

There are several difficulties associated with this harvesting operation. For example, due to the bulk and shape of the cut trees, it is often difficult to controllably carry them to the central cut tree storage area. The control of the holding action also becomes a problem when trees are being accumulated as they are cut. The configuration of the harvesting head may place a frame member in the operator's line of sight and make it difficult for the operator to see the engaged tree. Also, the sawdust and debris from the cutting of the tree often clogs in the guard assembly of the harvesting head or, if there is no guard assembly, can uncontrollably exit the side of the harvesting head at a high rate of speed or can circulate in the base of the harvesting head and cause wear to the saw and other components. For better efficiency, it is important to have the capacity to carry the largest number of cut trees that the harvester can lift. Finally, it is desirable to hold the cut trees centrally in the harvesting head for better operator control and component life resulting from the decreased torque on the harvester linkage.

U.S. Pat. No. 5,004,026, issued Apr. 2, 1991 to MacLennan et al. (hereafter referenced as '026) discloses a harvesting head of the type that accumulates trees and a method of operating same. '026 is directed toward a harvesting head that minimizes splintering of the butt ends of trees while felling them, and that also minimizes losing them off the harvesting head after they are cut. The harvesting head of '026 also has retaining means for loosely retaining the trees cut or being cut within tree receiving cradles provided on the harvesting head.

The harvesting head of '026 has only one grapple arm, which may contribute to a loss of control of a cut tree by providing a pivot point about which the cut tree can rotate in a vertical plane, should the cut tree become unstable as it is carried. '026 also does not appear to disclose several features claimed in the present invention, including a guard assembly for saw debris and a clear space between the posts of the saw for operator visibility.

Accordingly, the art has sought a method and apparatus of a tree harvesting head which: provides greater operator visibility; provides improved control of the cut trees; has more capacity for cut trees; can hold the cut trees centrally; provides a deflection and guard system for debris from the cutting device which is not easily clogged; may be used in a timely and efficient manner; and is more economical to manufacture and use.

The present invention is directed to overcoming one or more of the problems as set forth above.

DISCLOSURE OF THE INVENTION

In an embodiment of the present invention, a tree harvesting head is provided. The tree harvesting head includes an elongate frame, a first support device having a first grapple arm, a second grapple arm spaced from the first grapple arm, and a second support device having a collector mechanism and being located between the first support device and the second grapple arm. The elongate frame includes a central longitudinal axis, a first end portion, a second end portion, and a middle portion. The first support device and second support device each include a tree support member.

In an embodiment of the present invention, a tree harvesting head is provided. The tree harvesting head includes an elongate frame, a first support device, a second support device having a collector mechanism, a first grapple arm, a second grapple arm spaced from the first grapple arm, and a base portion. The elongate frame includes a central longitudinal axis, a first end portion, a second end portion, and a middle portion. The first support device and second support device each include a tree support member. The base portion includes a cutting device and a guard assembly. The guard assembly includes a deflector plate and a chute plate.

In an embodiment of the present invention, a method of harvesting trees with a harvesting head is provided. The method includes the steps of engaging a tree, cutting the tree, holding it with grapple arms while engaging it with a collector mechanism, and opening the grapple arms while holding the tree in an accumulator pocket with the collector mechanism.

BRIEF DESCRIPTION OF THE DRAWINGS

For a better understanding of the invention, reference may be made to the accompanying drawings in which.

BEST MODE FOR CARRTING OUT THE INVENTION

A preferred embodiment of the present invention provides an apparatus and method of a tree harvesting head. The following description uses a harvester as an example only. This invention may be applied to other types of work machines.

Figure 1:
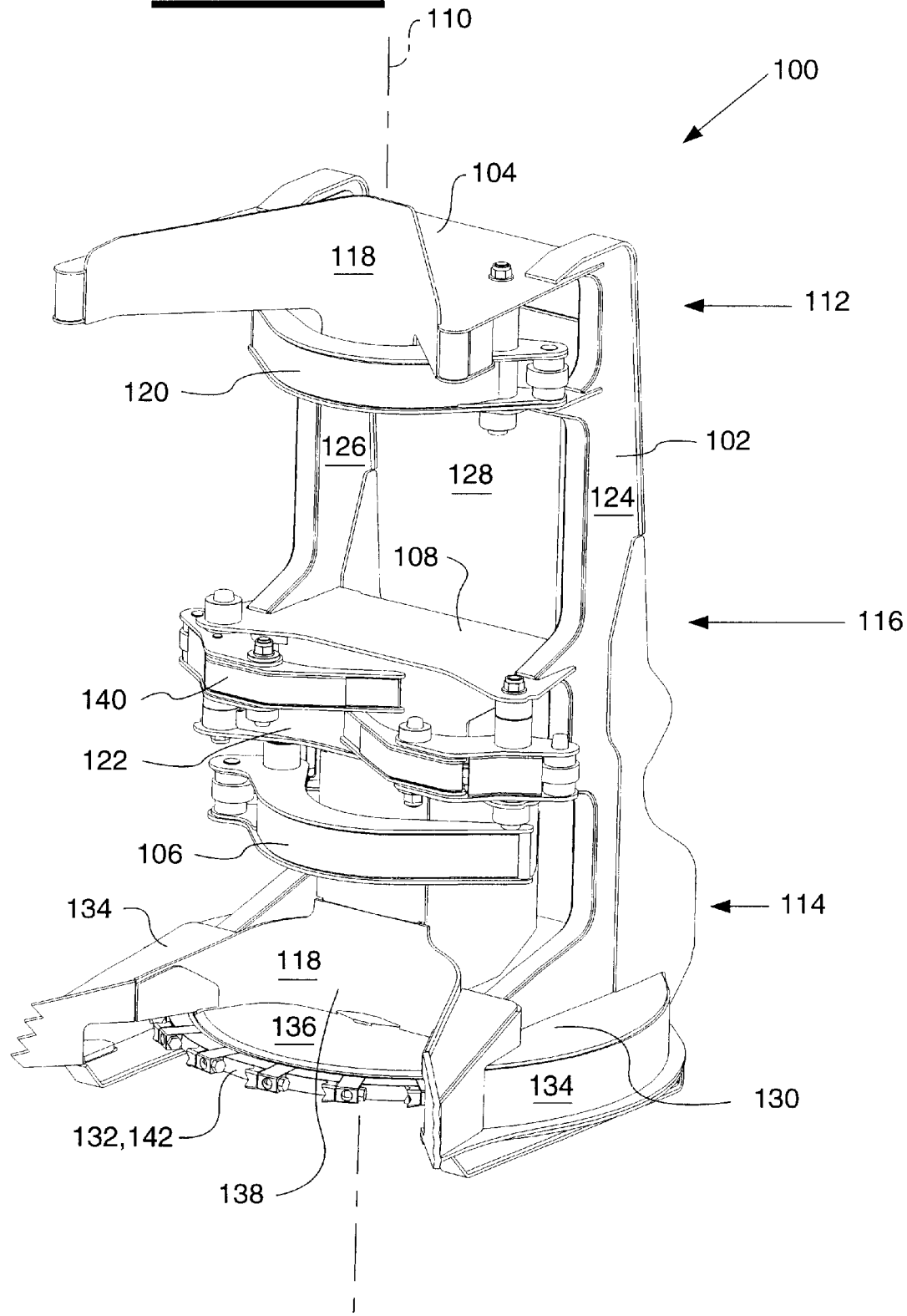
FIG. 1 is a perspective view of a preferred embodiment of the present invention.
Figure 2:
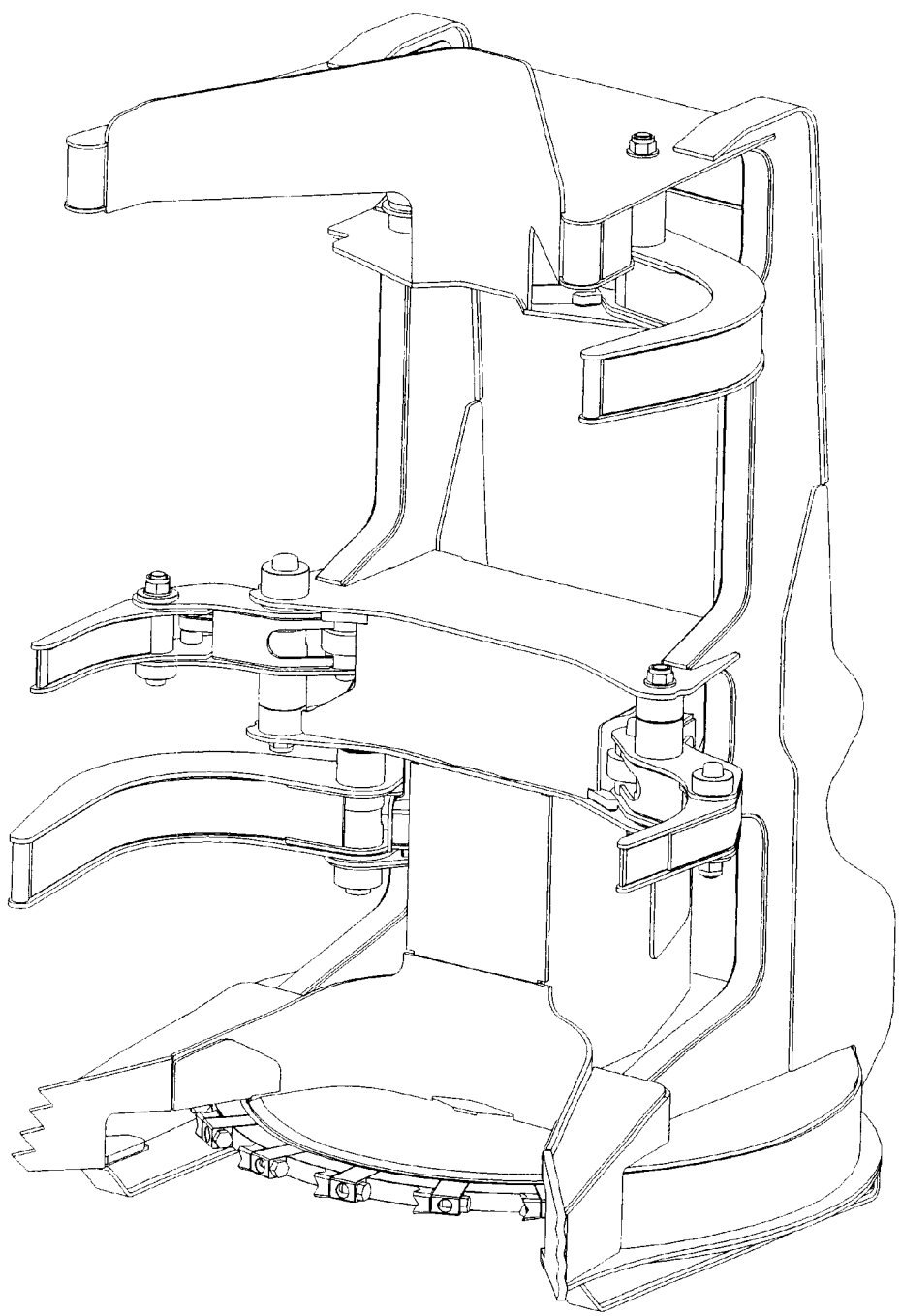
FIG. 2 is a perspective view of a preferred embodiment of the present invention.

As shown in FIGS. 1 and 2, a harvesting head 100 has an elongate frame 102, a first grapple arm 104, a second grapple arm 106, a first support device 108 and a second support device 110. The elongate frame 102 includes a central longitudinal axis 112, a first end portion 114, a second end portion 116 spaced apart from the first end portion 114 along the central longitudinal axis 112, and a middle portion 118 located longitudinally relative to the central longitudinal axis 112 between the first end portion 114 and the second end portion 116. The first support device 108, also known as a "yoke" or "cradle", is connected to the first end portion 114 and includes a tree support member 120 and a first grapple arm 104 pivotally connected with the elongate frame 102 from one side of the central longitudinal axis 112. The second grapple arm 106 is pivotally connected with the elongate frame 102 from an other side opposite the one side of the central longitudinal axis 112 and spaced longitudinally from the first grapple arm 104. The second support device 110 is connected to the middle portion 118 and located longitudinally relative to the central longitudinal axis 112 between the first support device 108 and the second grapple arm 106. The second support device 110 includes a tree support member 120 and a collector mechanism 122.

The collector mechanism 122 of the second support device 110 includes at least one, and preferably a pair in opposing relationship, collector arm 140 pivotally connected thereto. The operation of the collector mechanism 122 will be described hereafter as with one collector arm 140, but it is to be understood that two or more collector arms 140 could be used, as shown in FIGS. 1 and 2, without departing from the spirit or scope of the present invention. The collector arm 140 may be hinged or otherwise articulated.

The harvesting head 100 includes a first post 124 and a second post 126. The first post 124 and second post 126 are spaced transversely apart relative to the central longitudinal axis 112 and define a window 128 therebetween. The first grapple arm 104 may be pivotally connected, directly or through a linkage, with the first post 124. The second grapple arm 106 may be pivotally connected, directly or through a linkage, with the second post 126.

Preferably, the harvesting head 100 includes a base portion 130. The base portion 130 includes a tree support member 120 disposed thereon, a cutting device 132, a guard assembly 134, and an accumulator platform 136. The accumulator platform 136 and the tree support member 120 of the base portion 130 define an accumulator pocket 138. The accumulator platform 136 and the tree support member 120 are configured symetrically about the central longitudinal axis 112.

Figure 3:
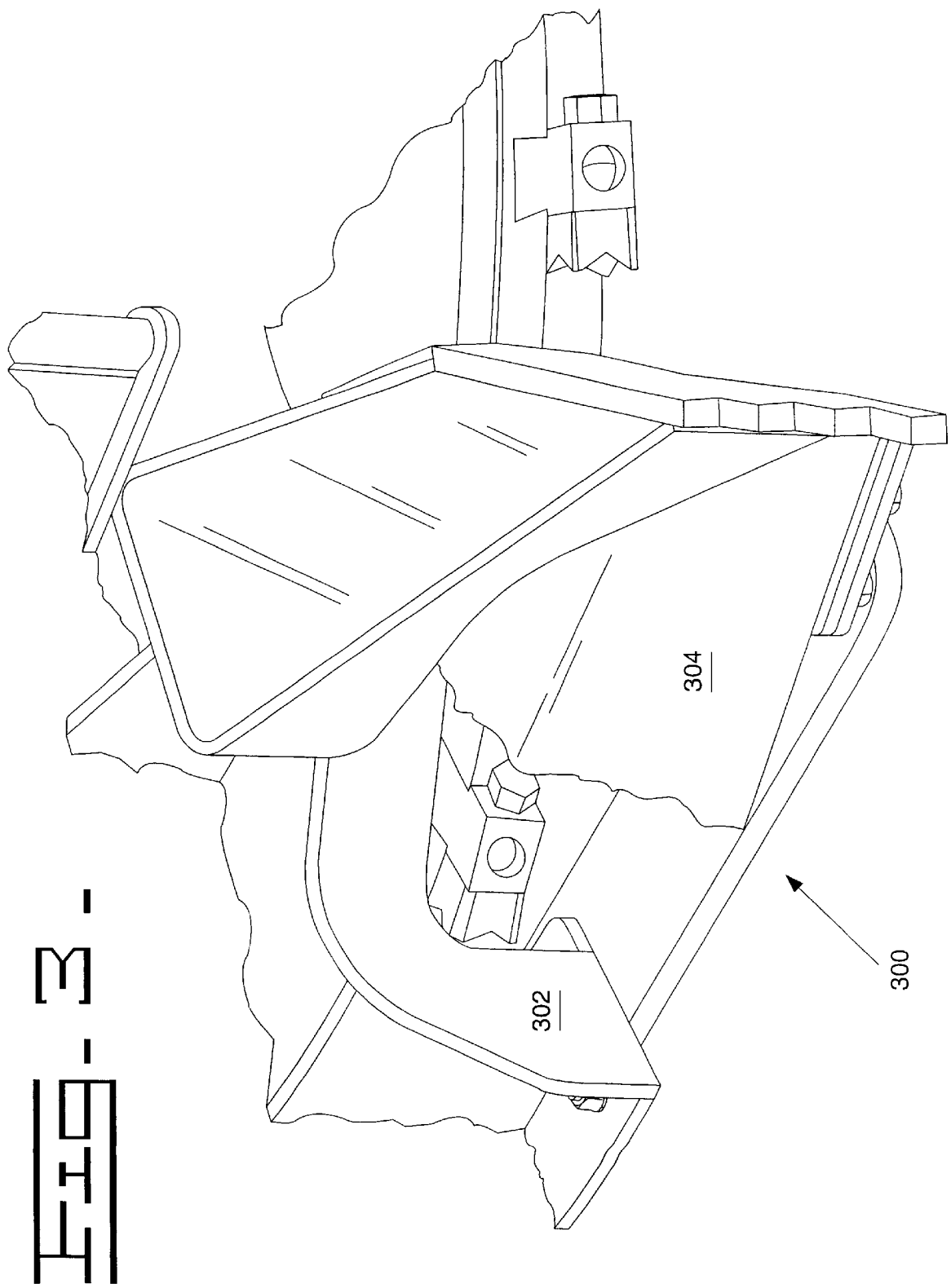
FIG. 3 is a partial perspective view of a preferred embodiment of the present invention.

The guard assembly 134 is shown in a cutaway detail in FIG. 3. The guard assembly 134 includes a discharge chute 300. The discharge chute 300 includes a deflector plate 302 and a chute plate 304.

While aspects of the present invention have been particularly shown and described with reference to the preferred embodiment above, it will be understood by those skilled in the art that various additional embodiments may be contemplated without departing from the spirit and scope of the present invention. For example, a different configuration of arms or other mechanisms could engage the tree, a chain or bar saw could replace the disk saw shown as a cutting device 132, or the guard assembly 134 could have a different configuration. However, a device or method incorporating such an embodiment should be understood to fall within the scope of the present invention as determined based upon the claims below and any equivalents thereof.

INDUSTRIAL APPLICABILITY

A harvesting head 100 is commonly used in the forestry industry to cut and transport trees. The harvesting head 100 is attached to a work machine (not shown), such as a harvester, via a linkage (not shown). The operator drives the harvester near the tree and reaches out with the linkage to bring the harvesting head 100 in contact with the tree. The operator manipulates the harvesting head 100 to open the first and second grapple arms 104,106 to a position in which they are able to engage the tree, as shown in FIG. 2. The operator moves the harvesting head 100 forward to cut through the trunk of the tree with the cutting device 132.

As the cutting device 132 cuts through the tree, sawdust, wood chips, and other small pieces of scrap material (hereafter referenced as "debris") are propelled by the cutting device 132. In the embodiment shown in FIGS. 1–3, the cutting device 132 is a saw disk 142. The saw disk 142 throws the debris tangentially at a high rate of speed in the direction of movement of the saw disk 142. The discharge chute 300 is shaped substantially tangentially to the cutting device 132 such that a portion of the debris which is not scattered is able to travel directly through the discharge chute 300 and away from the harvesting head 100 instead of remaining in the base portion 130. The remaining scattered debris, which is travelling substantially transversely to the central longitudinal axis 112, is deflected by the deflector plate 302 and chute plate 304. This deflection serves both to slow down the debris and to change the direction of movement of the debris to a direction substantially parallel to the central longitudinal axis 112 and away from the harvesting head 100.

The operator next clamps the now-cut tree with the first and second grapple arms 104,106 while resting the tree on the accumulator platform 136. By clamping, it is meant that the first and second grapple arms 104,106 contact the tree with any degree of force requested by the operator or programmed into an automatically controlled command. The first and second grapple arms 104,106 may be wholly, as shown in FIG. 1, or partially (not shown) in a closed position. It is also anticipated by the present invention for the operator to merely balance the tree and not contact the tree with the first and second grapple arms 104,106. The operation of the harvesting head will be discussed as if the first and second grapple arms 104,106 are clamped, however.

Once the tree is held on the accumulator platform 136 by the first and second grapple arms 104,106, the collector arm 140 or other collector mechanism 122 is brought to or maintained in an open position (as shown in FIG. 2). The collector arm 140 may be hinged or articulated in one or more places to allow it to bend and slip between the tree and structure of the harvesting head 100 to move from a closed to an open position, then can revert to its extended configuration for use. Once the collector arm 140 is open, it is manipulated, along with the first and second grapple arms 104,106 if needed, to bring the tree into the accumulator pocket 138, optionally contacting one or more of the tree support members 120 with the tree. The first and second grapple arms 104,106 are then opened while the collector arm 140 is maintained in a wholly, as shown in FIG. 1, or partially closed position to clamp the tree against the tree support member 120. Again, clamping may be accomplished with any degree of force necessary to maintain the tree in a longitudinal position.

The operator may transport the tree to a cut tree storage area (not shown) at this time, or may use the same procedure to gather one or more additional trees into the accumulator pocket 138, either centrally or to one or both sides of the accumulator pocket 138 until a predetermined capacity is reached and then transport the bundle of trees to the cut tree storage area (not shown).

The apparatus and method of certain embodiments of the present invention, when compared with other methods and apparatus, may have the advantages of: providing greater operator visibility; providing improved control of the cut trees; having more capacity for cut trees; being able to hold the cut trees centrally; providing a deflection and guard system for debris from the cutting device which is not easily clogged; being able to be used in a timely and efficient manner; and being more economical to manufacture and use. Such advantages are particularly worthy of incorporating into the design, manufacture, and operation of harvesting heads. In addition, the present invention may provide other advantages that have not been discovered yet.

Other aspects, objects, and advantages of the present invention can be obtained from a study of the drawings, the disclosure, and the appended claims.

LIST OF ELEMENTS

| | |
|---|---|
| 100 | harvesting head |
| 102 | elongate frame |
| 104 | first grapple arm |
| 106 | second grapple arm |
| 108 | first support device |
| 110 | second support device |
| 112 | central longitudinal axis |
| 114 | first end portion |
| 116 | second end portion |
| 118 | middle portion |
| 120 | tree support member |
| 122 | collector mechanism |
| 124 | first post |
| 126 | second post |
| 128 | window |
| 130 | base portion |
| 132 | cutting device |
| 134 | guard assembly |
| 136 | accumulator platform |
| 138 | accumulator pocket |
| 140 | collector arm |
| 142 | saw disk |
| 300 | discharge chute |
| 302 | deflector plate |
| 304 | chute plate |

What is claimed is:

1. A tree harvesting head, comprising:
an elongate frame having a central longitudinal axis, a first end portion, a second end portion spaced apart from the first end portion along the central longitudinal axis, and a middle portion located longitudinally relative to the central longitudinal axis between the first and second end portions;
first support device connected to the first end portion, the first support device having a tree support member disposed thereon and a first grapple arm pivotally connected with the elongate frame on a one side of the central longitudinal axis;
a second grapple arm located at the second end portion and pivotally connected with the elongate frame on an other side opposite the one side of the central longitudinal axis and spaced longitudinally from the first grapple arm; and
a second support device connected to the middle portion and located longitudinally relative to the central longitudinal axis between the first support device and the second grapple arm, the second support device having a tree support member disposed thereon and a collector mechanism connected therewith.

2. The tree harvesting head of claim 1, wherein the elongate frame includes a first post and a second post, the first and second posts being spaced transversely apart relative to the central longitudinal axis and defining a window therebetween.

3. The tree harvesting head of claim 2,
wherein the first grapple arm is pivotally connected with the first post and the second grapple arm is pivotally connected with the second post.

4. The tree harvesting head of claim 1, including a base portion connected to the second end portion, the base portion including a tree support member disposed thereon, a cutting device, a guard assembly, and an accumulator platform.

5. The tree harvesting head of claim 4,
wherein the collector mechanism of the second support device includes a pair of opposed collector arms pivotally connected thereto.

6. The tree harvesting head of claim 1,
wherein the accumulator platform and the tree supports each being substantially symmetrical about the central longitudinal axis.

7. The tree harvesting head of claim 4,
wherein the guard assembly includes a discharge chute positioned to deflect debris being propelled by the cutting device in a direction tangent to the central longitudinal axis in a direction away from the tree harvesting head and substantially parallel to the central longitudinal axis.

8. A tree harvesting head, comprising:
an elongate frame having a central longitudinal axis, a first end portion, a second end portion, and a middle portion located relative to the central longitudinal axis between the first and second end portions;
a first support device connected to the first end portion, the first support device having a tree support member and a first grapple arm pivotally connected with the elongate frame on a one side of the central longitudinal axis;
a second grapple arm pivotally connected with the elongate frame on another side opposite the one side of the central longitudinal axis and spaced longitudinally from the first grapple arm;
a second support device connected to the middle portion, the second support device including a tree support member and a collector mechanism; and
a base portion connected to the second end portion, the base portion having cutting device and a guard assembly, the guard assembly having a discharge chute, the discharge chute having a deflector plate and a chute plate, the deflector and chute plates being operative to deflect debris, propelled by the cutting device in a direction transverse to the central longitudinal axis, in a direction substantially parallel to the central longitudinal axis and away from the tree harvesting head.

9. A method of harvesting trees with a harvesting head having a central longitudinal axis, at least two grapple arms spaced longitudinally relative to the central longitudinal axis and on opposite sides of the central longitudinal axis, an accumulator platform and a tree support member defining an accumulator pocket, a collector arm, and a cutting device, comprising the steps of:
engaging a trunk of a first tree with a first grapple arm from a first side of the first tree and with a second grapple arm from a second side of the first tree and cutting through the trunk of the first tree with the cutting device;
clamping the trunk of the first tree with the first and second grapple arms and maintaining a butt portion of the first tree at rest on the accumulator platform;
maintaining the grapple arms in a clamped position about the first tree;
pivoting the collector arm from a closed position in which the collector arm is obstructing contact of the first tree and the tree support member to an open position in which the first tree may be positioned between the at least one collector arm and the tree support member;

clamping the first tree against the tree support member with the at least one collector arm to place the first tree in the accumulator pocket;

moving the grapple arms to an open position at which they are able to engage a second tree; and maintaining the first tree in the accumulator pocket by maintaining the clamped position of the collector arm.

10. The method of claim 9, further comprising the steps of:

engaging a trunk of the second tree with the first grapple arm from a first side of the second tree and with the second grapple arm from a second side of the second tree and cutting through the trunk of the second tree with the cutting device;

clamping the trunk of the second tree with the first and second grapple arms such that a butt portion of the second tree rests on the accumulator platform alongside the butt portion of the first tree;

maintaining the grapple arms in a clamped position about the second tree;

moving the collector arm to an open position;

clamping the second tree against at least one of the first tree and the tree support member with the collector arm;

moving the grapple arms to an open position;

holding the first tree and the second tree in the accumulator pocket; and repeating the method until the accumulator pocket contains a predetermined number of trees.

11. The method of claim 10, further comprising the step of:

selectively moving the grapple arms and the collector arm to allow at least one of the predetermined number of trees to completely disengage from the harvesting head and fall to, or be placed in, a predetermined position separate from the harvesting head.

* * * * *

UNITED STATES PATENT AND TRADEMARK OFFICE
CERTIFICATE OF CORRECTION

PATENT NO.     : 6,382,274 B1
DATED          : May 7, 2002
INVENTOR(S)    : Keith Hicks It is certified that error appears in the above-identified patent and that said Letters Patent is hereby corrected as shown below:

<u>Column 5,</u>
Line 41, add -- a -- at the beginning of this line. This line should then read
-- a first support device connected to the first end portion, the --

Signed and Sealed this

Twenty-ninth Day of October, 2002

Attest:

Attesting Officer

JAMES E. ROGAN
*Director of the United States Patent and Trademark Office*